Feb. 12, 1946.  J. F. SNUGGS  2,394,814

PROCESS FOR HANDLING FLUENT SOLIDS

Filed Dec. 31, 1941

Inventor:—
John F. Snuggs
By Everett A. Johnson
Attorney

Patented Feb. 12, 1946

2,394,814

UNITED STATES PATENT OFFICE 2,394,814

PROCESS FOR HANDLING FLUENT SOLIDS

John F. Snuggs, Chicago, Ill., assignor to Standard Oil Company, Chicago, Ill., a corporation of Indiana Application December 31, 1941, Serial No. 425,207

9 Claims. (Cl. 196—79)

This invention pertains to a catalytic conversion system and it relates more particularly to improvements in the process of handling fluid catalyst in a so-called fluid-type hydrocarbon catalytic conversion system.

In the fluid-type catalytic hydrocarbon conversion system a powdered or granular material effects conversion while the catalyst is suspended in the gases or vapors undergoing reaction. Subsequently the fluid catalyst and reaction products can be separated, the bulk of the fluid catalyst being withdrawn from the reaction zone and recycled to a reaction zone or passed to a regenerator. The spent catalyst can be regenerated by suspending it in a gas, usually containing oxygen, withdrawing the fluid catalyst from the regenerator, and recycling the fluid catalyst to the reactor. Catalyst is accumulated below the reaction or regeneration zone in a lock hopper, catastat or other pressuring means.

An object of the invention is to provide improved methods for transferring catalyst from a reactor or regenerator. A further object is to provide a process for stripping hydrocarbons from spent catalyst and air from regenerated catalyst. Other objects of the invention will be apparent as the detailed description proceeds.

According to the invention a stripping zone is provided between contacting zones in the catalyst circuit, for example at the upper end of the catastat, standpipe or any catalyst conduit generally. The stripping zone ordinarily will be of larger diameter than the main part of the standpipe or conduit. This stripping section can be within the reactor or regenerator. The powdered catalyst is in violent, turbulent movement within the contacting space and this turbulent action results in a tendency for the area of unstripped catalyst to extend some distance into the catalyst conduit. In other words, there is not good separation between the region of stripped and unstripped catalyst. This is objectionable in the cast of spent catalyst because even a small amount of unstripped catalyst puts an extra heavy load on the regenerator. By providing a plurality of longitudinal vanes within the stripping section, the possibility of unstripped catalyst passing down the standpipe is reduced. Likewise the tendency is less for the stripped catalyst to enter the contacting zone.

The powdered or fluid-type catalytic hydrocarbon conversion system can employ a wide variety of catalyst charging stocks, operating conditions, etc., for effecting alkylation, aromatization, dehydrogenation, desulfurization, gas reversion, hydrocarbon synthesis, hydrogenation, isoforming, isomerization, polymerization, reforming, etc., but it is particularly applicable to the catalytic cracking of reduced crude and gas oil for the production of high antiknock motor fuels, and aviation gasolines.

Catalysts adapted to my process are, for example, of the silica-alumina or silica-magnesia type. The catalyst can be prepared by the acid treating of natural clays such as bentonite or by synthetically preparing a powdered silica-alumina or silica-magnesia mixture. Such a mixture can be prepared by ball-milling silica hydrogel with alumina or magnesia, drying the resulting dough at a temperature of about 240° F. and then activating by heating to a temperature of between about 900° F. and about 1000° F. The catalyst per se forms no part of the present invention and it is, therefore, unnecessary to describe it in further detail.

When using powdered catalyst having a particle size of between about 1 and about 135 microns, I prefer to employ vapor velocities in the reactor of between about 0.4 and about 4 feet per second, for example about 1.5 or 2 feet per second. The catalyst-to-oil weight ratio can be between about 0.5:1 and about 20:1 and is preferably about 8 or 10 to 1 when treating reduced crude. The catalyst residence time may range from a few seconds to an hour or more, for example it may be about 4 to 10 minutes. The vapor residence time is usually about 10 to 30 seconds. The temperature prevailing throughout the reactor may be maintained at about 900° F. to about 975° F. for motor gasoline. A temperature as low as about 750° F. is satisfactory for aviation fuels.

The catalyst in this specific example is in powder form with a particle size of between about 1 and about 135 microns, i. e., with about 50% of the catalyst passing a 400-mesh screen. The invention is applicable, however, to other catalyst sizes provided only that the catalyst is such size and density that it can be aerated and handled as a fluid in the manner herein described. Higher gas or vapor velocities may be required for coarser catalyst particles but these particles can be of such size as to be retained on a 400, 300, 200, 100, or even 50-mesh screen.

The density of the catalyst particles per se may be as high as 160 pounds per cubic foot, but the bulk density of the catalyst which has settled for five or ten minutes will usually be from about 35 to about 60 pounds per cubic foot. With slight aeration, i. e., with vapor velocities of between about 0.05 and about 0.5 foot per second, the bulk density of 1 to 135 micron catalyst will be between about 20 and about 30 pounds per cubic foot. With vapor velocities of between about 1 and about 3 feet per second, the catalyst is in the dense turbulent suspended catalyst phase and the bulk density of such catalyst may be between about 10 and about 20 pounds, for example about 15 to 18 pounds per cubic foot. With higher vapor velocities, i. e. the vapor velocities existing in transfer lines, the catalyst is in a dilute dispersed phase, the density or which may be only about 1 to 2 pounds per cubic foot, or even less. Similarly, the light dispersed catalyst phase in the top of the reactors or regenerators can have a density of between about 5 or 100 grains and about 3 pounds per cubic foot. The light dispersed catalyst phase is at least 5, and preferably is at least 12 pounds per cubic foot lighter than the dense turbulent suspended catalyst phase. This latter phase usually is at least 1, preferably at least 5 pounds per cubic foot lighter than the aerated catalyst being transferred to the dense phase.

In practicing the invention fluid catalyst is withdrawn from the dense turbulent suspended catalyst phase through one or more catalyst conduits comprising overflow pipes or standpipes, for example. The upepr portion of the standpipe comprises a stripping section having longitudinal vanes hereinafter described. Stripping fluid such as steam is introduced and the stripped catalyst is accumulated in the dense aerated phase below the stripping section. The catalyst is stripped while in the dense phase. Other features of the invention will be apparent from the following detailed description.

In the accompanying drawing which constitutes a part of this disclosure and in which similar elements are designated by corresponding reference characters.

Figure 1:
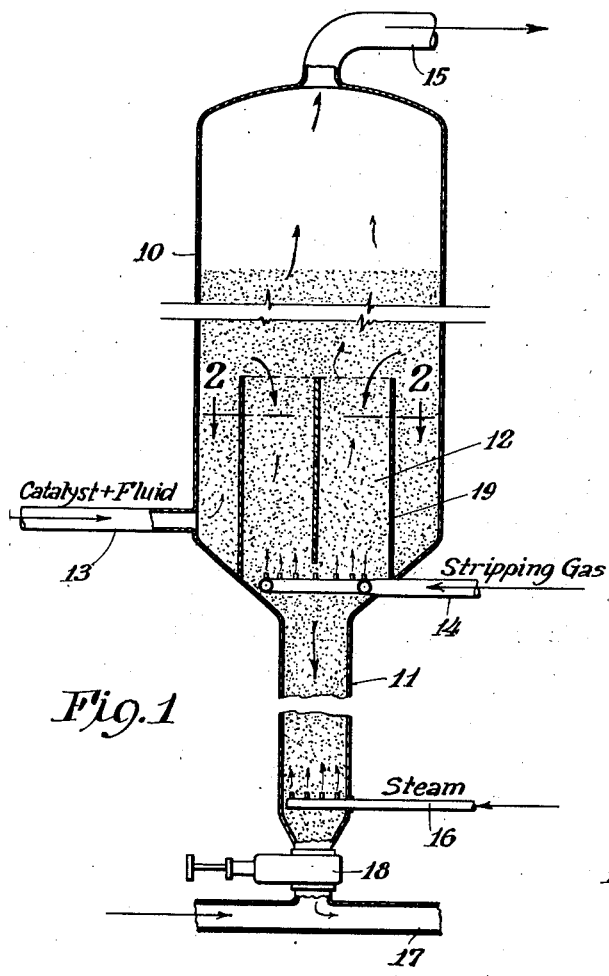
Figure 1 is a schematic vertical section of one embodiment of the invention which may be employed for either on-stream reaction or catalyst regeneration.

Figure 1 illustrates diagrammatically in more or less detail a contacting zone 10 which can be a reactor or regenerator. The contacting zone is superimposed upon a standpipe 11, the catalyst being withdrawn from the dense phase in zone 10 and accumulated therebelow in catastat 11. A stripping section 12 is interposed between the zone 10 and catastat 11. It is this stripping section which forms the basis of the present invention.

When the structure shown in Figure 1 is used for conversion, regenerated catalyst and charging stock vapors will be introduced through line 13. The spent catalyst is withdrawn through the stripping section 12 and catastat 11. Stripping steam is introduced by line or lines 14. The reaction products are passed to a residual catalyst recovery ssytem and thence to a suitable fractionation system through line 15.

The catalyst is maintained in fluent condition within the catastat 11 by means of an inert gas such as steam introduced through line 16. The amount of aeration gases should be such as to maintain the catalyst in fluent form and the catalyst column should be of such density as to provide the necessary pressure head at the base of the catastat. For obtaining densities of between about 20 and 30 pounds per cubic foot aeration gas is added to the catastat through line 16 or through a plurality of points (not shown) along the length of the catastat.

The contacting zone 10 when used as a reactor should be designed to provide a vertical vapor or gas velocity therein of between about 1 and about 3 feet per second. The charging stock can be heated in a pipe still to the reaction temperature or it can be simply preheated and vaporized within the contacting zone. A reaction temperature within the range of between about 800° F. and about 1050° F., preferably between about 900 and about 1000° F. can be used. The operating pressure ordinarily is within the range of between about 8 pounds per square inch and about 20 pounds per square inch in the case of cracking but in such processes as hydroforming or aromatization of aliphatic hydrocarbons the pressure usually will be higher, for example 50 to 450 pounds per square inch. In any event the upflowing vapors or gases are of such velocity as to maintain a dense turbulent suspended catalyst phase.

The contacting zone, whether it is operated as a reactor or regenerator can have an enlarged top section to facilitate the settling of catalyst particles out of the upper dilute catalyst phase. Additional catalyst can be knocked back or separated by cyclone separators, electrical precipitators, etc.

The oil is cracked to gasoline and gas and a coke or carbonaceous deposit accumulates on the catalyst particles. Oil vapors are removed from the spent catalyst according to the invention and the stripped catalyst is withdrawn from the contacting zone 10. The stripping can be effected by flowing the catalyst downwardly through the baffled stripping section 12 against an upwardly flowing blanket of steam. The stripped catalyst is discharged into catastat 11 and transferred to a similar contacting zone for regeneration.

The catalyst and air, other oxygen-containing gas or $CO_2$ are introduced into the regeneration contacting zone 10 via line 13. If desired the regeneration gas can be introduced into the contacting zone 10 independent of the catalyst introduction whereby the spent and stripped catalyst remains in a dense aerated phase during the transfer from reactor to regenerator.

The contacting zone 10 is operated under low velocity conditions under which the dense turbulent phase is formed in a lower portion of the contacting zone. The density of catalyst maintained in the zone 10 bears a relation to the velocity of the regeneration gas and the quantity of catalyst will vary dependent upon the amount of regeneration desired.

The upper desired temperature limits of regeneration are between about 1000° F. and about 1050° F., or higher, for example about 1300° F. with certain catalysts. When more heat is liberated in the regeneration than safely can be stored in the catalyst without exceeding these limits, it is necessary to provide means for removing heat such as recycling more cold catalyst or by use of internal boiler tubes and heat exchange with a similar contacting zone which is being operated as a reactor.

The regenerated catalyst passes through stripping section 12 in which the catalyst flows downwardly through the baffled zone against upwardly flowing steam or other stripping fluid. In this zone regeneration gases are stripped from the regenerated catalyst. The regenerated catalyst is removed through catastat or transfer conduit 11, introduced into transfer line 17 by valve 18 and passed to a similar contacting zone to promote reaction.

Figure 7:
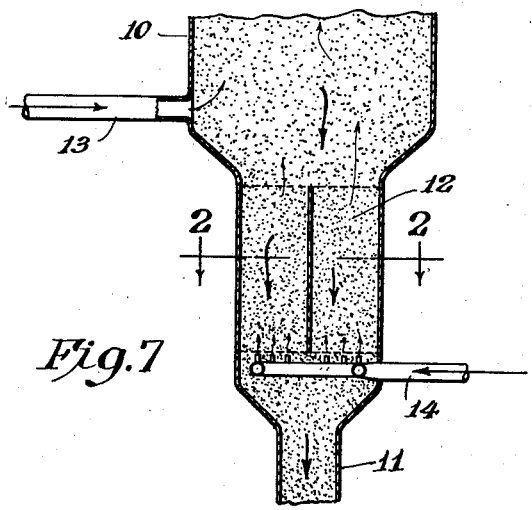
Figure 7 illustrates another embodiment using the stripping vanes of Figures 2–6.

Figure 1 illustrates the stripping section 12 as being within the contacting zone 10 and comprising an enlargement of the standpipe 11. If desired the stripping section 12 can be wholly outside and below the contacting zone 10 as illustrated in Figure 7. In either case the catalyst withdrawal is from the dense turbulent phase.

The systems hereinabove described are characterized by bottom catalyst withdrawal, i. e. catalyst is removed from the bottom of each zone instead of from the top thereof. It is not essential that this draw-off be at the very bottom of the zone but the upper end of the catalyst draw-off should in all cases be below the level of the dense turbulent suspended catalyst phase in said zone if dense phase transfer is desired.

The invention can be applied to other systems as well. For example, the catalyst and gases or vapors can be removed from the contacting zone in the dilute phase and the catalyst reaccumulated in an area associated with a stripping section in accordance with this invention.

The catalyst is stripped in the dense phase while flowing substantially vertically downward countercurrent to a stripping fluid such as steam. The stripping fluid has a vertical velocity within the range of between about 0.05 and 3.0 feet per second. The stripping section is characterized by the longitudinal baffles defining a plurality of elongated stripping cells each having a cross sectional area within the range of about one to ten or more square feet.

Figure 2:
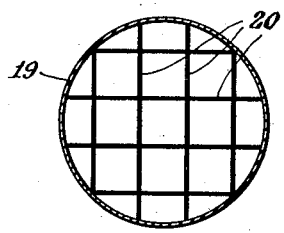
Figures 2, 3, 4, 5 and 6 illustrate embodiments of the stripping vanes.
Figure 3:
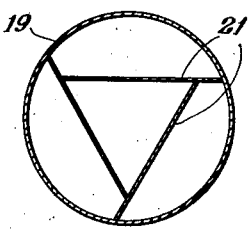
Figure 4:
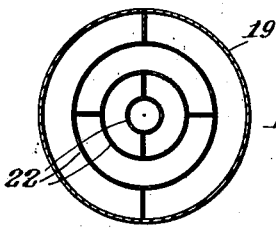
Figure 5:
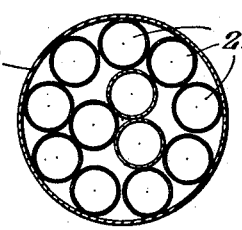
Figure 6:
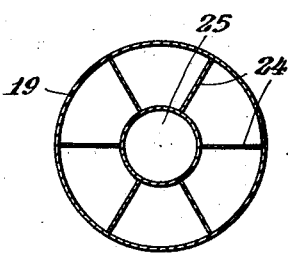

Figures 2, 3, 4, 5 and 6 of the drawing illustrate various forms of longitudinal vanes comprising the stripping section. The views are taken along the line 2—2 of Figures 1 and 7. Figure 2 comprises a plurality of vanes 20 at right angles to one another within shell 19. Figure 3 illustrates three intersecting baffles 21 dividing the compartment. Figure 4 shows a plurality of concentric tubes 22 and Figure 5 a bundles of tubes 23. Figure 6 combines a plurality of radial baffles 24 and a concentric tube 25.

Suitable modification of stripping gas inlet 14 can be made to accommodate the various configurations of the vanes or baffles. Other embodiments of the invention will be apparent to those skilled in the art.

Although the process has been described in terms of illustrative embodiments thereof, it is not intended that the invention is limited except by the following claims.

What is claimed is:

1. The process of stripping fluidized finely divided catalyst whereby a tendency to short circuit or by-pass within a stripping zone is avoided, which method comprises withdrawing downwardly a stream of catalyst from a first contacting zone, subdividing the stream of fluent catalyst into a plurality of separately confined streams of small cross-sectional area, passing stripping fluid countercurrent to each of said streams at a vertical velocity within the range of between about 0.05 and 3.0 feet per second, recombining the stripping gases at one end of said stripping zone and recombining the separately stripped streams of fluent catalyst at the other end of the stripping zone, introducing the recombined stripping gases into said first-mentioned contacting zone and accumulating the stripped catalyst in a dense fluent phase.

2. The method of stripping a vaporizable hydrocarbon from spent fluent finely divided solid catalyst which method comprises flowing increments of said catalyst downwardly in a dense turbulent suspended phase in a plurality of separately confined parallel adjacent streams of relatively small cross-sectional area, flowing a stripping gas upwardly through each of said streams at a vertical velocity within the range of between about 0.05 and 3.0 feet per second, causing all of the dense turbulent suspended catalyst to move downwardly in contact with the upflowing stripping gas, and accumulating the stripped catalyst in a dense fluent phase.

3. The method of replacing a suspending gas for suspended fluidized solid catalyst which method comprises introducing fluidized solid catalysts suspended in a first suspending gas into an elongated stripping zone, dividing said fluidized solid catalyst into a plurality of parallel adjacent separately confined streams of relatively small cross-sectional area, downwardly flowing said streams while maintaining the catalyst in the dense phase, introducing at a low point in said stripping zone a second suspending gas to serve as a stripping gas, and suspending the downwardly flowing fluidized catalyst in the upwardly flowing second gas within the stripping zone whereby the first gas is displaced by the second gas and the catalyst is suspended substantially entirely in the second gas as the stripping operation progresses.

4. The method of claim 3 wherein the first gas consists essentially of hydrocarbons and the second gas consists essentially of steam.

5. The method of claim 3 wherein the first gas consists essentially of oxygen-containing combustion products and the second gas consists essentially of steam.

6. In the continuous contacting of gasiform fluids with solid catalytic materials in a process wherein the solid catalyst in finely divided form is suspended in gasiform fluids during a reaction, the improvement which comprises passing catalyst downwardly through a catalyst stripping zone in a plurality of parallel confined streams of relatively small cross-sectional area separated only by vertical partitions, introducing stripping fluid into said zone, and withdrawing the solids from the bottom of the stripping zone, the velocity of the stripping medium being maintained low during the passage of the finely divided solids downwardly through the stripping zone and the density of catalyst in the separate streams is substantially higher than in the reaction zone, whereby the desired degree of contact between the stripping medium and catalyst is obtained while at the same time limiting short circuiting and undesirable mixing in said stripping zone which would result if an unobstructed stripping zone were used.

7. The process of claim 6 wherein the solid material is a spent powdered cracking catalyst from a superposed reaction zone and the stripping medium is steam.

8. The process of claim 6 wherein the velocity of the stripping fluid passing through the stripping zone is between about 0.5 and 3.0 feet per second.

9. The process of claim 6 wherein the suspended catalyst passing downwardly through the stripping zone as a plurality of confined streams has a density of between about 20 and 30 pounds per cubic foot, stripping fluid is passed upwardly through said stripping zone at a velocity of between about 0.05 and .5 foot per second, the density of the suspended catalyst within a superposed reaction zone is between about 10 and 20 pounds per cubic foot, and the vertical velocity of the hydrocarbons through the reaction zone is between about 1 and 3 feet per second.

JOHN F. SNUGGS.